United States Patent [19]

Chandra

[11] Patent Number: 6,085,242
[45] Date of Patent: Jul. 4, 2000

[54] METHOD FOR MANAGING A REPOSITORY OF USER INFORMATION USING A PERSONALIZED UNIFORM LOCATOR

[76] Inventor: Rohit Chandra, 987 Rosa Ct., Sunnyvale, Calif. 94086

[21] Appl. No.: 09/225,651

[22] Filed: Jan. 5, 1999

[51] Int. Cl.[7] ................................................. G06F 15/173
[52] U.S. Cl. ........................................... 709/223; 709/224
[58] Field of Search .................... 395/200.53, 200.54, 395/200.55, 200.58, 200.79; 709/223, 224, 225, 228, 249

[56] References Cited

U.S. PATENT DOCUMENTS

| | | | |
|---|---|---|---|
| 5,708,780 | 1/1998 | Levergood et al. | 395/200.59 |
| 5,745,681 | 4/1998 | Levine et al. | 395/200.3 |
| 5,794,259 | 8/1998 | Kikinis | 707/507 |
| 5,812,769 | 9/1998 | Graber et al. | 395/200.58 |
| 5,812,776 | 9/1998 | Gifford | 395/200.47 |
| 5,892,825 | 4/1999 | Mages et al. | 380/3 |

*Primary Examiner*—Zarni Maung
*Attorney, Agent, or Firm*—Blakely, Sokoloff, Taylor & Zafman LLP

[57] ABSTRACT

An apparatus and method for implementing a personalized uniform Resource Locator (URL) for a network user is disclosed. The personalized URL apparatus and method comprises the steps of: 1) assigning a unique user identifier associated with the user information, and 2) creating a personalized URL using at least a portion of the unique user identifier prepended to a domain name.

21 Claims, 7 Drawing Sheets

METHOD FOR MANAGING A REPOSITORY OF USER INFORMATION USING A PERSONALIZED UNIFORM LOCATOR

BACKGROUND OF THE INVENTION

1. Field of the Invention

The present invention relates to the field of computer networks and systems employing uniform resource locators.

2. Description of Related Art

Uniform Resource Locators (URLs) are a well-known mechanism for accessing sites and documents on the World Wide Web (WWW). Using this mechanism, a particular document can be uniquely identified by reference to the structured information in the URL. Because of the quantity of sites and documents on the WWW, it is often necessary to remember a long string of arcane alphanumeric characters to access a particular document. If any characters of the URL are missing or out of place, the site or document access will fail.

In the busy world of human interaction, it is often difficult enough to remember the name of a new acquaintance much less a URL associated with the person. It would be advantageous if a person's name or a brief user identifier could be used to access public information related to that person on the WWW. Currently, however, one must remember a long URL which points to the person's network resident information or one must navigate through a Website to find information related to the person.

Thus, an apparatus and method for implementing a personalized uniform Resource Locator (URL) for a registered network user is needed.

SUMMARY OF THE INVENTION

The present invention is an apparatus and method for implementing a personalized Uniform Resource Locator (URL) for a registered network user. The personalized URL apparatus and method comprises the steps of: 1) assigning a unique user identifier associated with user information, and 2) creating a personalized URL using at least a portion of the unique user identifier prepended to a domain name.

DETAILED DESCRIPTION OF THE PREFERRED EMBODIMENT

The present invention is an apparatus and method for implementing a personalized Uniform Resource Locator (URL) for a registered network user. In the following detailed description, numerous specific details are set forth in order to provide a thorough understanding of the present invention. However, it will be apparent to one of ordinary skill in the art that these specific details need not be used to practice the present invention. In other circumstances, well known structures, materials, circuits, and interfaces have not been shown or described in detail in order not to unnecessarily obscure the present invention.

Figure 1:
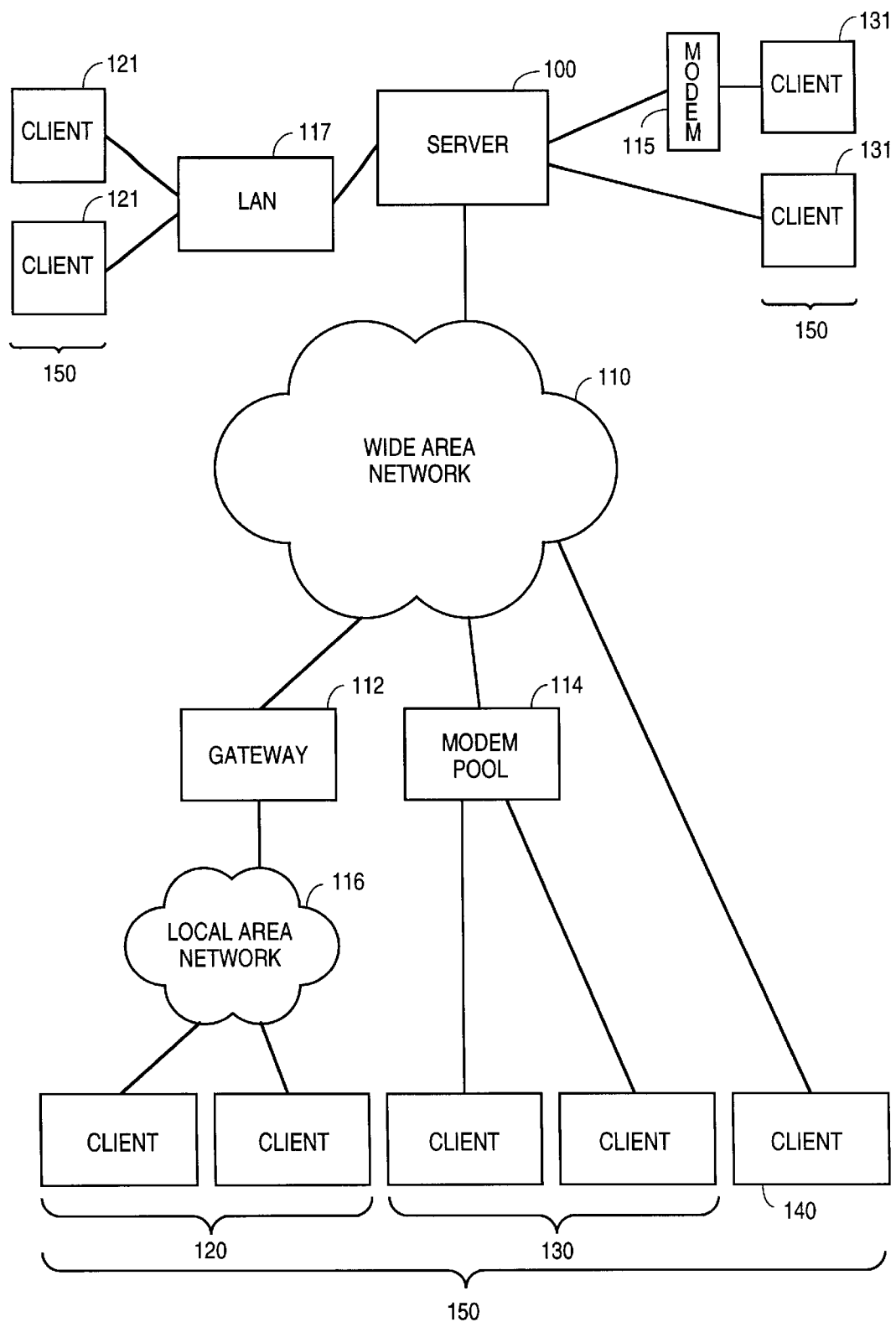
FIG. 1 illustrates a prior art computer network topology.

Referring now to FIG. 1, a diagram illustrates the network environment in which the present invention operates. In this conventional network architecture, a server computer system 100 is coupled to a wide-area network 110. Wide-area network 110 includes the Internet, or other proprietary networks including America On-Line™, CompuServe™, Microsoft Network™, and Prodigy™, each of which are well known to those of ordinary skill in the art. Wide-area network 110 may include conventional network backbones, long-haul telephone lines, Internet service providers, various levels of network routers, and other conventional means for routing data between computers. Using conventional network protocols, server 100 may communicate through wide-area network 110 to a plurality of client computer systems 120, 130, 140 possibly connected through wide-area network 110 in various ways or directly connected to server 100. For example, client 140 is connected directly to wide-area network 110 through direct or dial up telephone or other network transmission line. Alternatively, clients 130 may be connected through wide-area network 110 using a modem pool 114. A conventional modem pool 114 allows a plurality of client systems to connect with a smaller set of modems in modem pool 114 for connection through wide-area network 110. Clients 131 may also be connected directly to server 100 or through modem 115 in a conventional way. In another alternative network typology, wide-area network 110 is connected to a gateway computer 112. Gateway computer 112 is used to route data to clients 120 through a local area network 116. In this manner, clients 120 can communicate with each other through local area network (LAN) 116 or with server 100 through gateway 112 and wide-area network 110. Alternatively, LAN 117 may be directly connected to server 100 and clients 121 may be connected through LAN 117.

Using one of a variety of network connection means, server computer 100 can communicate with client computers 150 using conventional means. In a particular implementation of this network configuration, a server computer 100 may operate as a web server if the World-Wide Web (WWW) portion of the Internet is used for wide area network 110. Using the HTTP protocol and the HTML coding language across a network, web server 100 may communicate across the World-Wide Web with clients 150. In this configuration, clients 150 use a client application program known as a web browser such as the Netscape™ Navigator™ published by Netscape Corporation of Mountain View, Calif., the Internet Explorer™ published by Microsoft Corporation of Redmond, Wash., the user interface of America On-Line™, or the web browser or HTML translator of any other conventional supplier. Using such conventional browsers and the World-Wide Web, clients 150 may access graphical and textual data or video, audio, or tactile data provided by web server 100. Conventional means exist by which clients 150 may supply information to web server 100 through the World-Wide Web 110 and the web server 100 may return processed data to clients 150.

Figure 2:
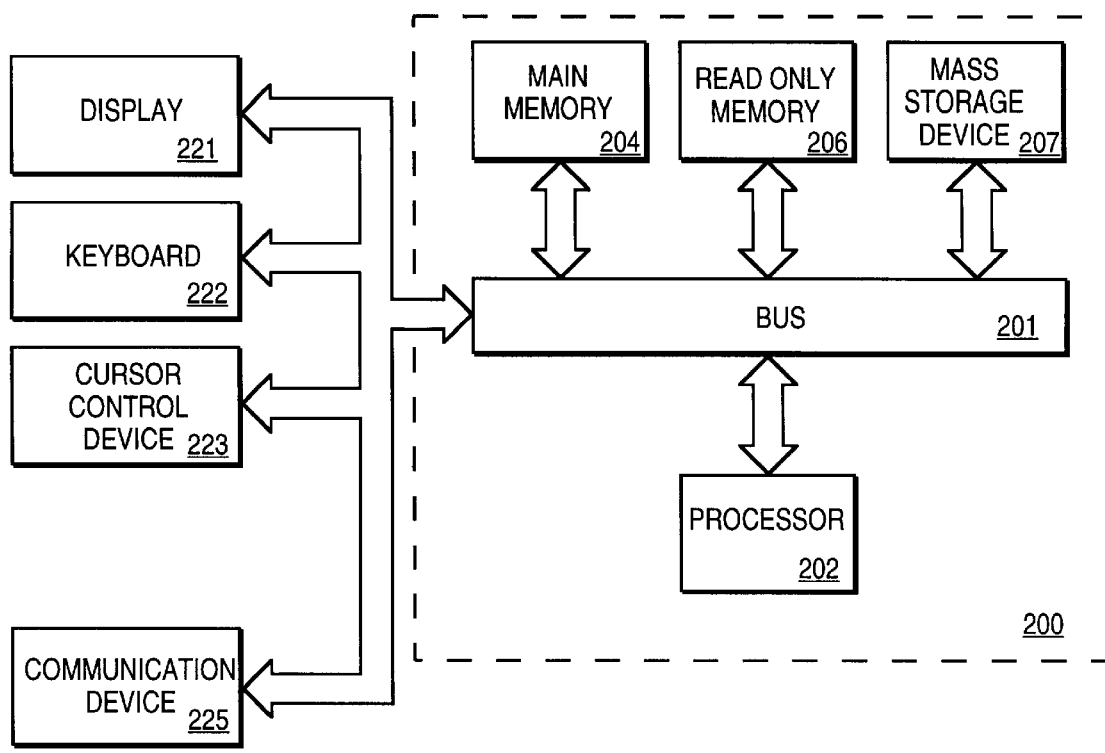
FIG. 2 illustrates the prior art architecture of a conventional computer system.

Having briefly described one embodiment of the network environment in which the present invention operates, FIG. 2 illustrates an example of a computer system 200 illustrating an exemplary client 150 or server 100 computer system in which the features of the present invention may be implemented. Computer system 200 is comprised of a bus or other communications means 201 for communicating information, and a processing means such as processor 202 coupled with bus 201 for processing information. Computer system 200 further comprises a random access memory (RAM) or other dynamic storage device 204 (commonly referred to as main memory), coupled to bus 201 for storing information and instructions to be executed by processor 202. Main memory 204 also may be used for storing temporary variables or other intermediate information during execution of instructions by processor 202. Computer system 200 also comprises a read only memory (ROM) and/or other static storage device 206 coupled to bus 201 for storing static information and instructions for processor 202.

An optional data storage device 207 such as a magnetic disk or optical disk and its corresponding drive may also be coupled to computer system 200 for storing information and instructions. Computer system 200 can also be coupled via bus 201 to a display device 221, such as a cathode ray tube (CRT) or a liquid crystal display (LCD), for displaying information to a computer user. For example, graphical or textual information may be presented to the user on display device 221. Typically, an alphanumeric input device 222, including alphanumeric and other keys is coupled to bus 201 for communicating information and/or command selections to processor 202. Another type of user input device is cursor control device 223, such as a conventional mouse, touch mouse, trackball, or other type of cursor direction keys for communicating direction information and command selection to processor 202 and for controlling cursor movement on display 221. A fully-loaded computer may optionally include video, camera, speakers, sound card, and many other conventional options.

Alternatively, the client 150 can be implemented as a network computer or thin client device, such as the WebTV Networks™ Internet terminal or the Oracle™ NC. Client 150 may also be a laptop or palm-top computing device, such as the Palm Pilot™. Such a network computer or thin client device does not necessarily include all of the devices and features of the above-described exemplary computer system; however, the functionality of the present invention may nevertheless be implemented with such devices.

A communication device 225 is also coupled to bus 201 for accessing remote computers or servers, such as web server 100, or other servers via the Internet, for example. The communication device 225 may include a modem, a network interface card, or other well known interface devices, such as those used for interfacing with Ethernet, Token-ring, or other types of networks. In any event, in this manner, the computer system 200 may be coupled to a number of servers 100 via a conventional network infrastructure such as the infrastructure illustrated in FIG. 1 and described above.

The present invention includes various processing steps, which will be described below. The steps of the present invention may be embodied in machine or computer executable instructions. The instructions can be used to cause a general purpose or special purpose processor, which is programmed with the instructions to perform the steps of the present invention. Alternatively, the steps of the present invention may be performed by specific hardware components that contain hard wired logic for performing the steps, or by any combination of programmed computer components and custom hardware components. While embodiments of the present invention will be described with reference to the World-Wide Web, the method and apparatus described herein is equally applicable to other network infrastructures or other data communications systems.

Figure 3:
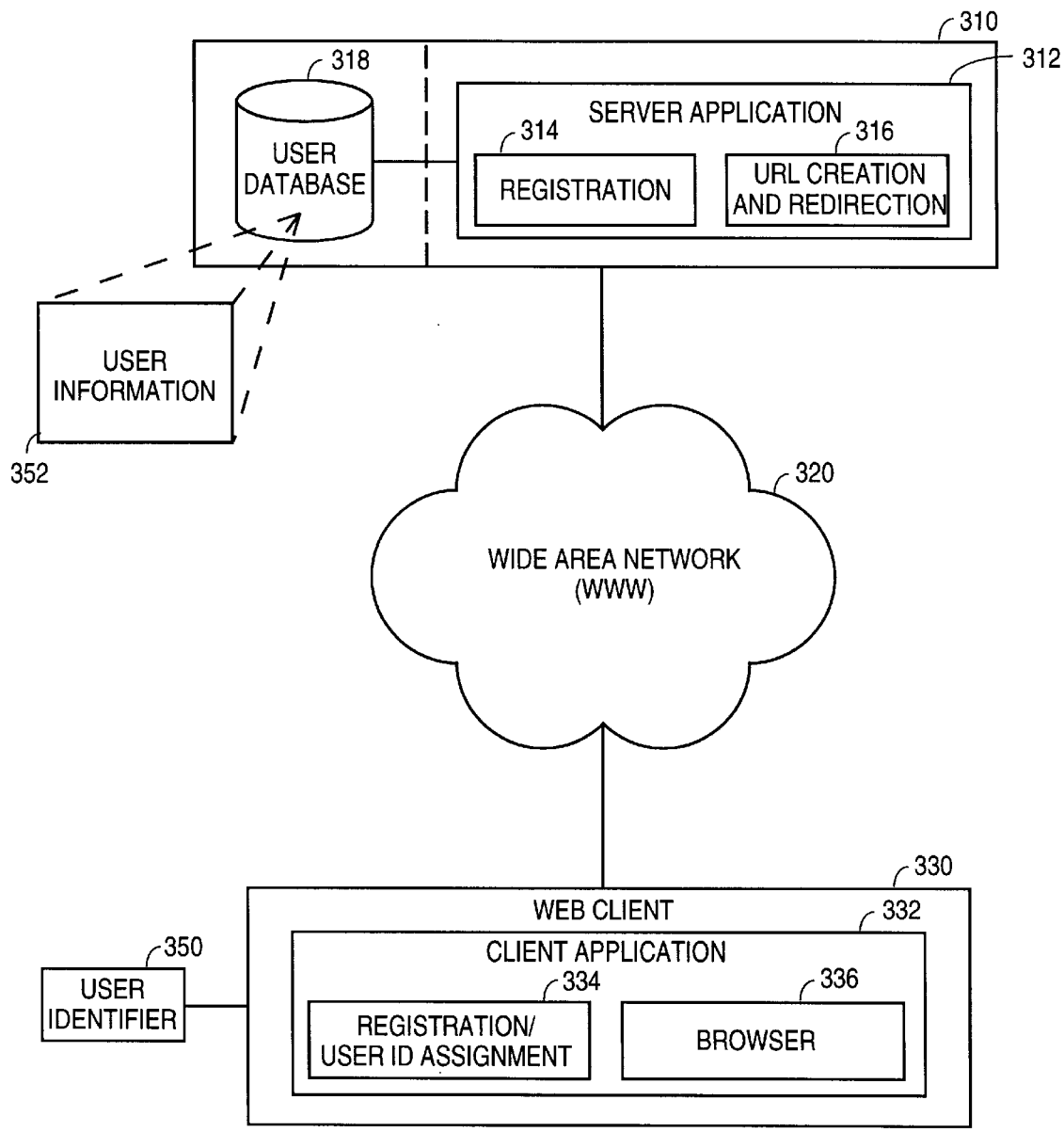
FIG. 3 illustrates the computer network architecture of the preferred embodiment.

Referring now to FIG. 3, a preferred embodiment of the network configuration of the present invention is illustrated. In the preferred embodiment, a web server 310 is coupled with web client 330 through the wide-area network or Internet 320. As described above, web server 310 and web client 330 may be implemented as conventional computer systems. Software application programs for implementing the present invention run on web server 310 and web client 330. The server portion of the application software of the present invention is shown as server application 312. The client side portion of the application software of the present invention is shown as client application 332 illustrated in FIG. 3. In addition, web server 310 includes or has access to a user database or information store 318 for storing and managing user information. As indicated by the dashed line in web server 310, user database 318 may be incorporated into web server 310 or may be operated as a database system independent of, but accessible to web server 310.

In general, the present invention provides a means and method for managing a repository of user information, which is made accessible across a wide-area network 320. User information includes, for example, a personalized Web page or HTML document, an electronic form of a personalized business card, a person's name, title, address, telephone/cellular number, facsimile number, pager number, email address, corporate name, corporate logo, license number, company motto or slogan, digitized photograph or graphic, company logo, brief description of a company or employer, audio or video clip, schedule, driving directions or map, a personal or proprietary Web page, and other personal identifying information or categorical information associated with an entity, a person, a company, or organization. It will be apparent to one of ordinary skill in the art that the user information may include a variety of different types of information associated with a particular individual or entity. The user information is represented in FIG. 3 as box 352. In the preferred embodiment, the user information 352 is authorized for access by users on the WWW.

According to the present invention, a novel user identifier information item 350 is provided. User identifier 350, in the preferred embodiment, is an alphanumeric code, which uniquely identifies the associated user information 352. Alternatively, another digital representation other than an alphanumeric code may also be used. For example, a well known technique called URL Encode may be used to format or encode the user identifier or a complete URL. Once the user information 352 is entered into user database 318 as will be described in more detail below, user identifier 350 may be used to access the corresponding user information in user database 318. Alternatively, the user identifier 350 may be used to access already existing user information.

User identifier 350 may be represented in a variety of equivalent formats. In the preferred embodiment, the user identifier 350 comprises a code identifier "eCode", for example, "Rohit77". It will be apparent to one of ordinary skill in the art that other equivalent alphanumeric or coded strings may be used as a user identifier. In general, the user identifier may be distinct from the person's name in order to assure a level of proprietary or confidential control over the publication/retrieval of user information 352. In an alternative embodiment, user identifier 350 may be encrypted using a variety of conventional techniques, such as URL Encode. In another alternative embodiment, user identifier 350 may be a public key associated with conventional data encryption and decryption techniques. The unique user identifier 350 may be explicitly specified by a user, or the user identifier 350 may be automatically generated and suggested to the user by the software of the present invention.

Figure 4:
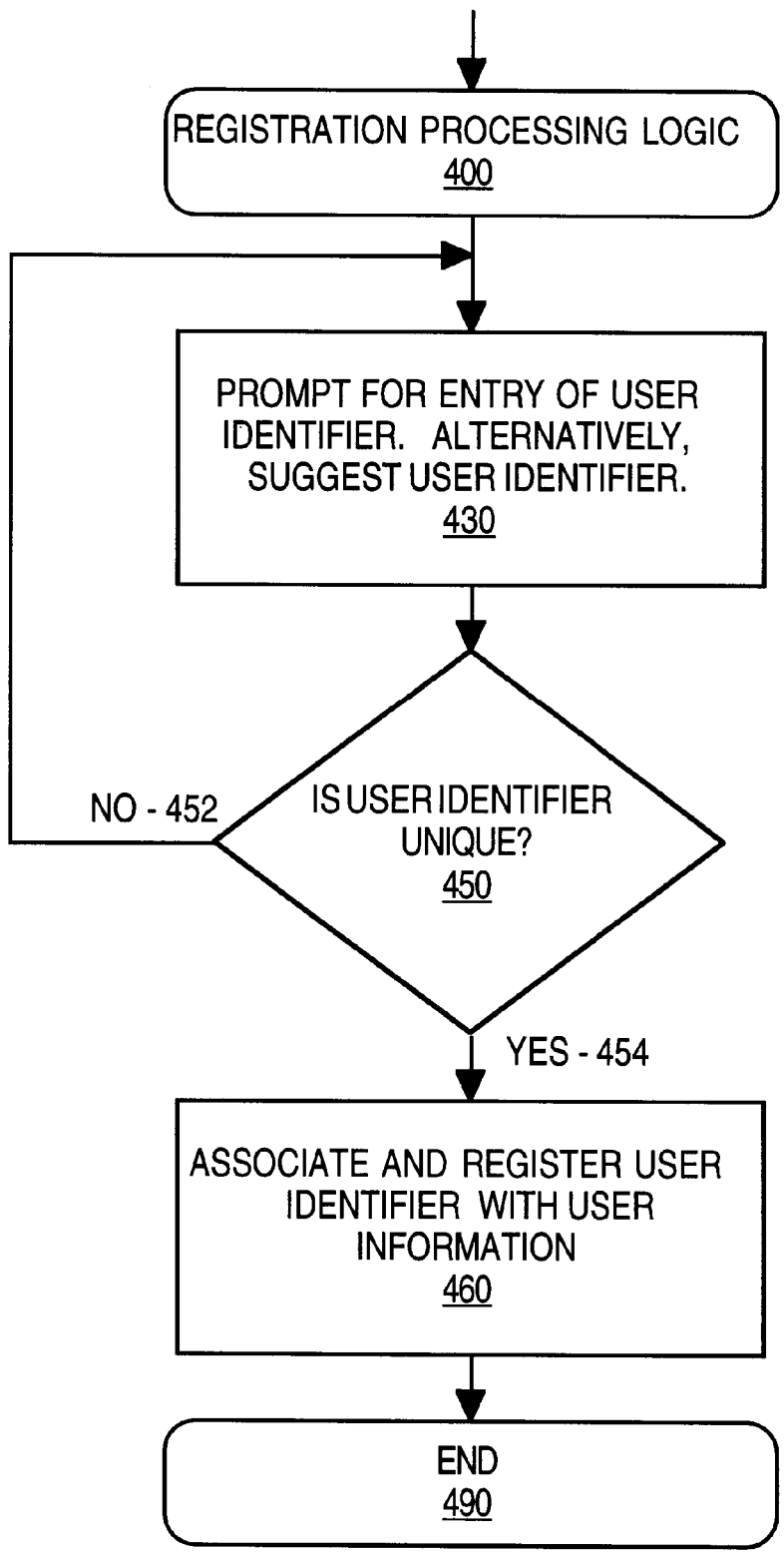
FIGS. 4–7 are flowcharts illustrating the processing logic performed by the present invention.
Figure 5:
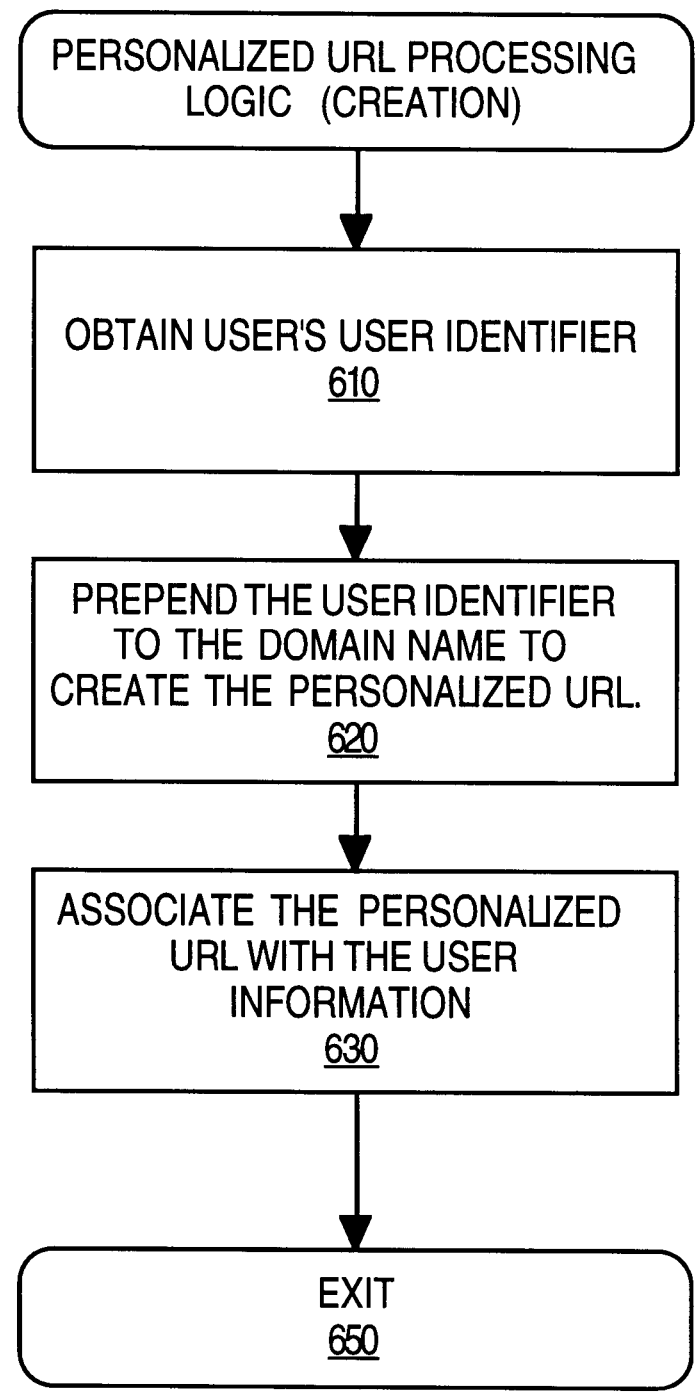
Figure 6:
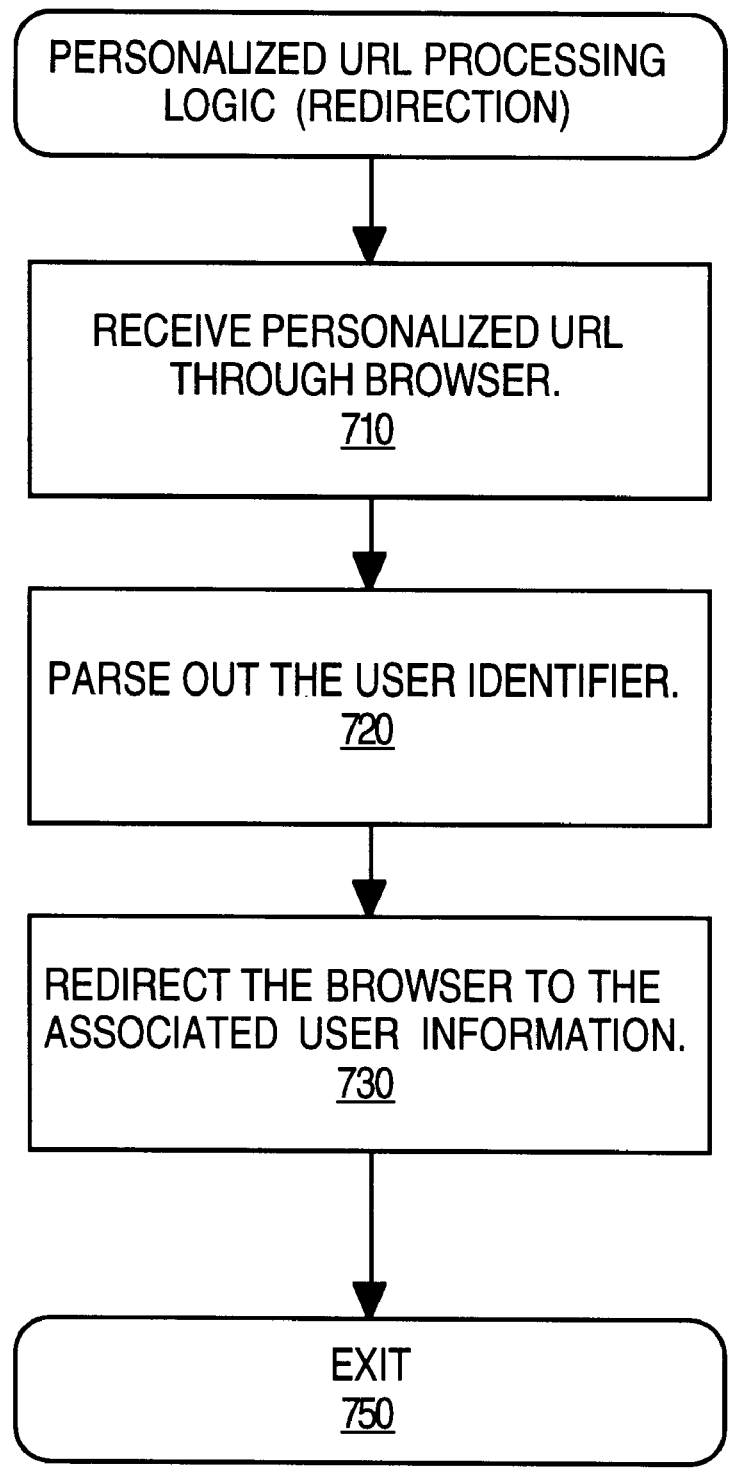
Figure 7:
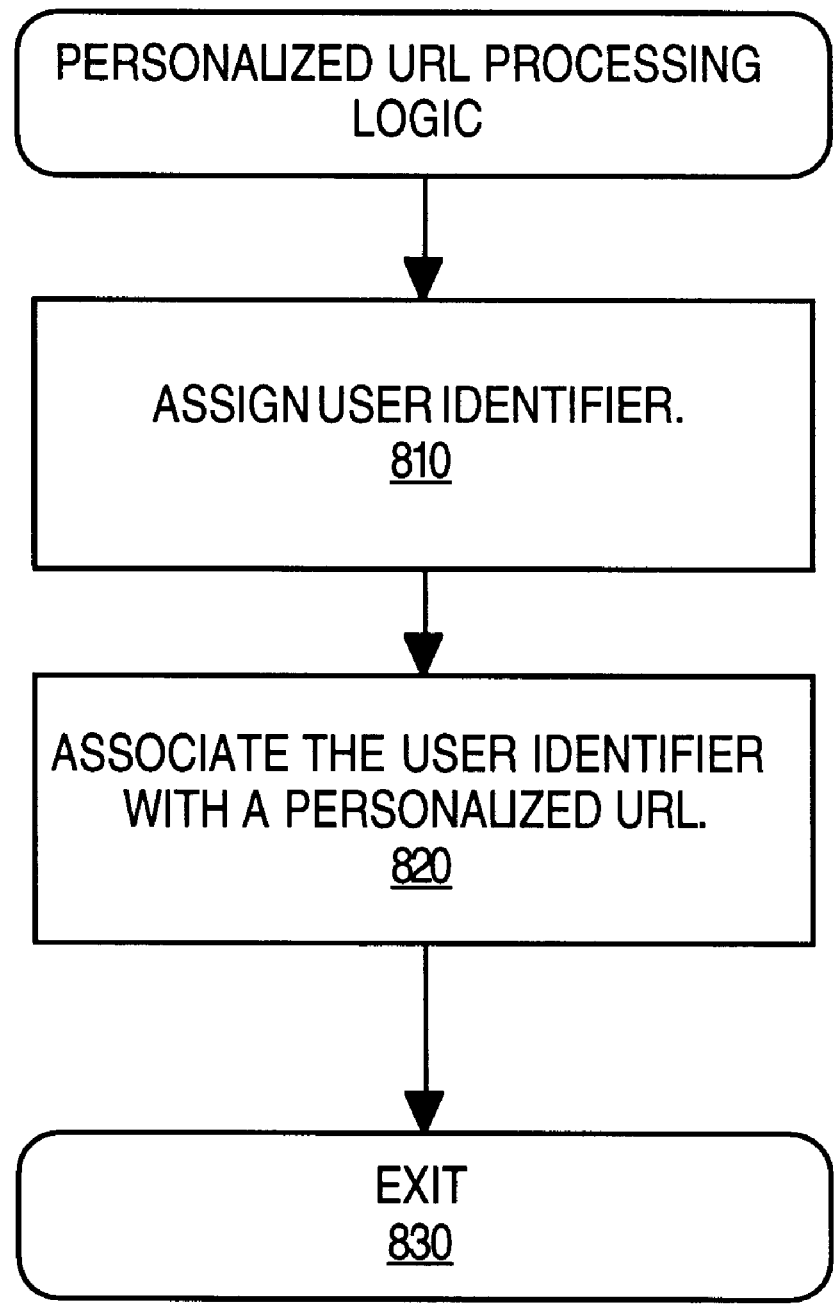

Referring again to FIG. 3, the client application software 332 and server application software 312 include at least two basic functional components. The registration component is used to create and/or edit user information in user database 318. The registration process of the present invention is implemented using a client application registration component 334 and a server application registration component 314. The operation of these components for registering user information is shown in FIG. 4 and described below. Of course, registration of the user information is not necessary if the user information is already available from an existing source. This embodiment is illustrated in FIG. 7 and described below. Secondly, a URL creation and redirection function provides a means by which a client may use a known user identifier 350 to access and read or download associated user information from user database 318. A browsing component 336 in client application 332 and a URL creation and redirection component 316 in server application software 312 is used to implement the URL processing operation of the present invention. The URL processing logic is illustrated in FIGS. 5 and 6 and described below.

Referring now to FIG. 4, the registration processing logic of the preferred embodiment is illustrated. The registration processing logic is used to create and/or update user information in the user database 318. Initially, a user activates client application 332 and invokes the registration component 334. Using this component, a user activates the registration operation to initiate creation of new user information. The registration component 334 optionally prompts the user for the entry of the user information and other auxiliary information. It is also possible for the user information to be already resident in some known and accessible location. As described above, the user information may include a personalized Web page, an electronic business card, a name, title, address, telephone, email and other identifying and auxiliary information associated with the person. In processing block 430, the user is prompted for the entry of a user identifier associated with the user information being registered. Alternatively, the present invention may also automatically generate or retrieve a previously created user identifier and suggest the user identifier to the user. As described above by way of example, the user identifier may be an arbitrary alphanumeric string or other identifying code associated with the user information. Once the user enters or confirms the user identifier, the web client 330 makes access to web server 310 across the network 320 in order to query user database 318 for the presence of the user identifier. If the user identifier is unique (not previously associated with different user information), processing path 454 is taken to processing block 460. If the user identifier is not unique, processing path 452 is taken back to processing block 430 where the user is prompted for the entry of a different user identifier or optionally a system-generated suggested user identifier is provided for the user.

In processing block 460, the user has entered or confirmed a unique user identifier. At this point, the user identifier is associated with or appended to the other user information and the web client 330 again accesses web server 310. Web server 310 accesses user database 318 to register the new user information with user database 318. Once the user information has been registered with the user database 318, the user identifier may be returned to the user through web client 330. Registration processing logic then terminates through the end bubble 490.

Once a user has registered with the server implementing the present invention, the user will have a unique user identifier 350 assigned to him/her. This user identifier can be used to create a unique personalized uniform resource locator (URL). Using this user identifier, anyone knowing the user identifier can access the public user information for the registered user by entering the user's personalized URL into a conventional browser. 15 This simplifies the process of accessing the user's user information. The personalized URL is created and used as follows with reference to FIGS. 5 and 6.

Referring to FIG. 5, the processing of the present invention for creating a personalized URL is illustrated. At processing block 610, a registered user's user identifier 350 is obtained. The user identifier 350 is generated as described above. The user identifier uniquely identifies the user (for example, Rohit77) at the server site 310 implementing the present invention (for example, www.eCode.com). In block 620, the user's user identifier is prepended to the domain name of the server site implementing the present invention. For example, the personalized URL may be formatted as follows:

Rohit77.eCode.com or bill+clinton.eCode.com

Optionally, the personalized URL may be further encoded or encrypted.

In block 630, the personalized URL is associated with a path to the first page of the registered user's user information maintained by the server site 310 implementing the present invention. The process for generating a personalized URL terminates at bubble 650.

Referring to FIG. 6, the redirection processing performed for responding to a browser access to a personalized URL is illustrated. In block 710, the server site 310 implementing the present invention receives an access from a browsing user to the personalized URL of a user through a conventional browser. In block 720, the present invention parses out the user identifier from the personalized URL. In block 730, the browsing user is redirected to the user information associated with the referenced user identifier. The browser may then obtain the user information and return the user information to the browsing user for display to the browsing user. The process of the present invention terminates at bubble 750.

Referring to FIG. 7, an embodiment of the present invention is illustrated where the user information is already existing in an accessible location. In this case, the user merely assigns a user identifier to the existing user information (block 810) and associates the user identifier with a personalized URL (block 820) as described in detail above.

In this manner, the user information (i.e. personalized Web page) associated with a particular individual or organization may be correlated with a corresponding personalized URL created from a user identifier. This user identifier may thereafter be used to obtain access to the corresponding user information (i.e. personalized Web page) via the personalized URL. The present invention therefore enables several advantages. The user's personalized Web page in user database 318 may be updated as needed by the user. Once updated, the new user information (i.e. personalized Web page) is immediately available to any other clients who access the information using the associated user identifier and personalized URL. In this manner, the user information (i.e. personalized Web page) associated with a user identifier is always current and up to date.

Another advantage of the present invention is that the user identifier allows the user to retain a certain level of proprietary or confidential control over the user information. Because the user information in user database 318 is accessed using a custom code (i.e. the user identifier and personalized URL), the user can be assured that only those individuals to whom he/she gives out his/her user identifier either directly or indirectly will have access to his or her corresponding user information.

Thus, an apparatus and method for implementing a personalized uniform Resource Locator (URL) for a registered network user is described. Although the present invention is described herein with reference to a specific preferred embodiment, many modifications and variations therein will readily occur to those with ordinary skill in the art. Accordingly, all such variations and modifications are included within the intended scope of the present invention as defined by the following claims.

We claim:

1. A method for managing a repository of user information using a personalized URL comprising:

assigning a unique user identifier to a network user;

associating the unique user identifier with user information in the repository of user information; and retrieving at least a portion of the user information from the repository of user information upon receiving a personalized URL from a client, the personalized URL being based upon at least a portion of the unique user identifier prepended to a domain name.

2. The method as claimed in claim 1 further including the step of:

registering a new user identifier into the repository of user information.

3. The method as claimed in claim 1 further including the step of:

adding personal categories to the user information in the repository of user information.

4. The method as claimed in claim 1 further including the step of:

adding auxiliary information to the user information in the repository of user information.

5. The method as claimed in claim 1 further including the step of:

notifying the network user if the user entered user identifier is not unique in the repository of user information.

6. The method as claimed in claim 1 further including the step of:

encrypting the user identifier.

7. The method as claimed in claim 1 further including the step of:

encrypting the personalized URL.

8. The method as claimed in claim 1 wherein the unique user identifier is either automatically generated or specified by the network user.

9. The method as claimed in claim 1 wherein the at least a portion of the user information is public information.

10. The method as claimed in claim 1 wherein the user information in the repository of user information is updated with current user information by the network user using a corresponding user identifier.

11. The method as claimed in claim 1 wherein the repository of user information is either incorporated into a web server or is accessible by a web server.

12. An apparatus for managing a repository of user information using a personalized URL, comprising:

an identifier associator for associating a unique user identifier with a network user;

a repository updator for entering and modifying user information associated with the unique user identifier in the repository of user information; and a browser for retrieving at least a portion of the user information from the repository of user information upon receiving a personalized URL from a client, the personalized URL being based upon at least a portion of the unique user identifier prepended to a domain name.

13. The apparatus as claimed in claim 12 further comprising an identifier registrator for registering a new user identifier into the repository of user information.

14. The apparatus as claimed in claim 12 further comprising a user notifier for notifying the network user if the user entered user identifier is not unique in the repository of user information.

15. The apparatus as claimed in claim 12 further comprising an encryptor for encrypting the user identifier and the personalized URL.

16. The apparatus as claimed in claim 12 wherein the unique user identifier is either automatically generated or specified by the network user.

17. The apparatus as claimed in claim 12 wherein the at least a portion of the user information is public information.

18. The apparatus as claimed in claim 12 wherein the user information in the repository of user information is updated with current user information by the network user using a corresponding user identifier.

19. The apparatus as claimed in claim 12 wherein the repository of user information is either incorporated into a web server or is accessible by a web server.

20. The apparatus as claimed in claim 12 further comprising an encoder for encoding the user identifier and the personalized URL.

21. A computer readable medium comprising instructions, which when executed on a processor, perform method for managing a repository of user information using a personalized URL, comprising:

assigning a unique user identifier to a network user;

associating the unique user identifier with user information in the repository of user information; and retrieving at least a portion of the user information from the repository of user information upon receiving a personalized URL from a client, the personalized URL being based upon at least a portion of the unique user identifier prepended to a domain name.

* * * * *